(No Model.)
R. GABARRO.
ELECTRIC DRY CELL.
No. 503,415. Patented Aug. 15, 1893.
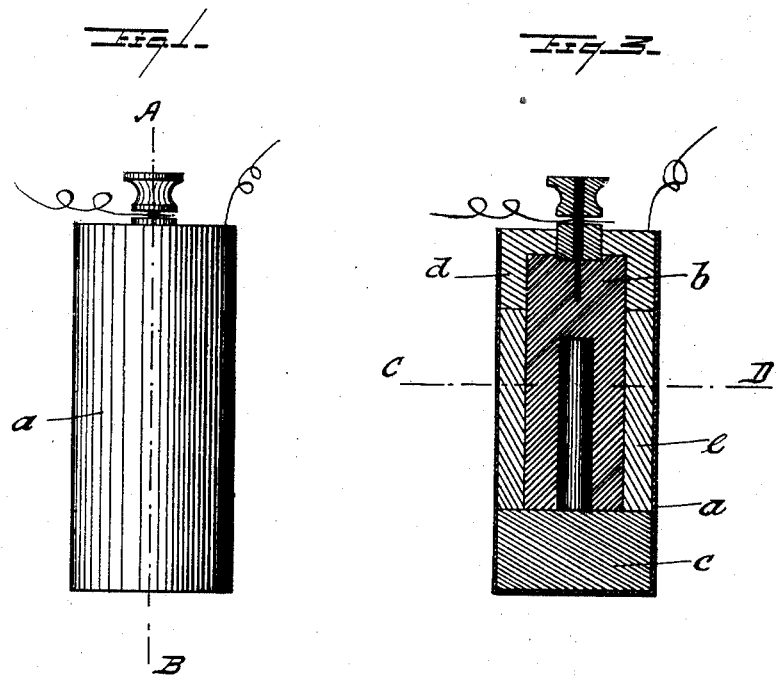
Witnesses.
Inventor
Ramon Gabarro
by his Attorney

UNITED STATES PATENT OFFICE.

RAMON GABARRO, OF BARCELONA, SPAIN.

ELECTRIC DRY CELL.

SPECIFICATION forming part of Letters Patent No. 503,415, dated August 15, 1893.

Application filed January 18, 1893. Serial No. 458,862. (No model.) Patented in Spain July 21, 1892, No. 13,377, and February 22, 1893, No. 14,019.

*To all whom it may concern:*

Be it known that I, RAMON GABARRO, a subject of the King of Spain, residing at Barcelona, Spain, have invented a certain new and useful Improvement in Electric Dry Cells, (for which I have obtained Letters Patent in Spain, dated July 21, 1892, and numbered 13,377, together with a patent of addition, dated February 22, 1893, and numbered 14,019,) of which the following is a specification.

The object of this invention is to produce a simple, cheap and effective galvanic battery or cell of the kind usually termed a dry cell.

Reference being made to the annexed sheet of drawings Figure 1 is an elevation of the improved cell. Fig. 2 is a plan view thereof. Fig. 3 is a vertical central section on the line A B Fig. 1, and Fig. 4 is a horizontal section on line C D Fig. 3.

The outer vessel $a$ forms one of the electrodes and is made of zinc; it may be of any suitable shape but the cylindrical form shown in the drawings is perhaps the most convenient. The base of the vessel is filled with a layer $c$ of electrically insulating material preferably wax and on this the other electrode a central block of carbon $b$ rests. This block may be hollow or solid and of any suitable form, that shown in the drawings being cylindrical. On the upper end of the electrode $b$ is a binding screw of suitable kind. Between the electrodes $a$ and $b$ the cell is filled with the composition $e$ hereinafter described and the upper end of the cell is sealed and closed with a filling of insulating material $d$ preferably resin.

The composition is as follows: The following materials are taken in the proportions given and are mixed together, sal ammoniac $NH_4Cl$ one hundred and seventy-five parts, chloride of zinc $ZnCl_2$ one hundred parts, oxide of zinc $ZnO$ one hundred and fifty parts, water $H_2O$ one hundred and twenty-five parts, sulphate of magnesia $MgSO_4$ one hundred parts, clay two hundred and twenty-five parts, ivory black twenty-five parts. To these may be added if desired hydrochloric acid $H.Cl$ one hundred parts and mercuric sulphate $Hg.SO_4$ one hundred parts.

According to the purpose which the cells are to serve some of the above ingredients may be omitted or replaced by others of equivalent nature.

In certain instances, two compositions may be employed, similar in their respective actions and effects to the two fluids of two fluid batteries, the said two compositions being inserted each next to the respective electrode on or with which it is more particularly to operate.

I claim—

A galvanic dry cell consisting of an outer vessel of zinc, a layer of wax or equivalent insulating material in the base thereof, a central electrode of carbon in said vessel, a composition comprising sal ammoniac, chloride of zinc, oxide of zinc, sulphate of magnesia, water, clay and ivory black in substantially the proportions set forth, between the carbon and zinc and a sealing of resin or equivalent insulating material filling the upper part of said vessel as illustrated and described.

In witness whereof I have signed this specification in presence of two witnesses.

RAMON GABARRO.

Witnesses:
   JUAN GAVARRO,
   HERBERT W. BOWEN,
       *U. S. Consul.*